United States Patent [19]

Bernard et al.

[11] Patent Number: 4,988,440

[45] Date of Patent: Jan. 29, 1991

[54] COOKING OIL FILTER

[75] Inventors: Robin D. Bernard, Bothell; John G. Gardner, Woodinville; Jun Ueki, Seattle, all of Wash.

[73] Assignee: Filtercorp, Inc., Bothell, Wash.

[21] Appl. No.: 395,722

[22] Filed: Aug. 18, 1989

Related U.S. Application Data

[63] Continuation-in-part of Ser. No. 303,854, Jan. 30, 1989, Pat. No. 4,959,144.

[51] Int. Cl.$^5$ ............................................. B01D 39/18
[52] U.S. Cl. ..................................... 210/504; 210/505; 210/508; 210/510.1; 210/DIG. 8
[58] Field of Search .................. 210/502.1, 503, 504, 210/505, 506, 508, 510.1, DIG. 8; 428/297

[56] References Cited

U.S. PATENT DOCUMENTS

| | | | |
|---|---|---|---|
| 2,601,598 | 6/1952 | Daniel et al. | 210/508 |
| 3,019,127 | 1/1962 | Czerwonka et al. | 210/508 |
| 3,327,859 | 7/1967 | Pall | 210/282 |
| 3,356,218 | 12/1967 | Grudoski | 210/167 |
| 3,849,312 | 11/1974 | Wecker, Sr. | 210/237 |
| 3,880,757 | 4/1975 | Thomason | 210/167 |
| 3,933,643 | 1/1976 | Colvin et al. | 210/243 |
| 3,968,741 | 7/1976 | Hunt | 210/186 |
| 3,983,843 | 10/1976 | Johnson | 210/169 |
| 4,025,438 | 5/1977 | Gelman et al. | 210/484 |
| 4,032,457 | 6/1977 | Matchett | 210/489 |
| 4,043,916 | 8/1977 | Wecker, Sr. | 210/238 |
| 4,079,001 | 3/1978 | Haase et al. | 210/502 |
| 4,238,334 | 12/1980 | Halbfoster | 210/504 |
| 4,282,094 | 8/1981 | Mitchell | 210/167 |
| 4,395,332 | 7/1983 | Klein | 210/496 |
| 4,404,285 | 9/1983 | Hou | 210/508 |
| 4,517,082 | 5/1985 | Prudhomme | 210/117 |
| 4,591,434 | 5/1986 | Prudhomme | 210/117 |
| 4,623,455 | 11/1986 | Adcock | 210/168 |
| 4,668,390 | 5/1987 | Hurley et al. | 210/167 |
| 4,676,904 | 6/1987 | Schröder | 210/508 |
| 4,702,827 | 10/1987 | Wenzel | 210/117 |
| 4,768,426 | 9/1988 | Nett | 210/167 |
| 4,826,594 | 5/1989 | Turman | 210/98 |
| 4,859,340 | 8/1989 | Hou et al. | 210/508 |

OTHER PUBLICATIONS

Bunge's Hints for Improved Frying, pp. 1-3.

*Primary Examiner*—Ivars Cintins
*Assistant Examiner*—Cynthia L. Nessler
*Attorney, Agent, or Firm*—Christensen, O'Connor, Johnson & Kindness

[57] ABSTRACT

An improved filter comprising a porous sheet of substantially uniform thickness having the following composition: 15% to 35% activated carbon; 15% to 40% calcium silicate, magnesium silicate, or mixtures thereof; 25% to 40% cellulosic fiber; up to 2% resin binder; and, optionally, 0% to 30% diatomaceous earth.

10 Claims, No Drawings

COOKING OIL FILTER

RELATED APPLICATIONS

This application is a continuation-in-part of prior copending application, Ser. No. 303,584, filed Jan. 30, 1989, now U.S. Pat. No. 4,959,144 the filing date of which is hereby claimed pursuant to 35 U.S.C. 120.

TECHNICAL FIELD

This invention relates to filters and, more particularly, to filters employed in filtering hot cooking oil such as that used in commercial deep fryers.

BACKGROUND OF THE INVENTION

Cooking oils, such as those used in commercial or institutional deep fryers, tend to become contaminated with moisture, carbonized food particles, and the like during the frying process. Additionally, the oils themselves tend to break down chemically after extended use. Both the contaminants and the chemical breakdown byproducts have the undesirable characteristics of causing the oil to foam, smoke, smell bad, possess an unsightly appearance, or impart a bad taste to the fried food. It has been found that keeping the cooking oil clean by removing the particulate matter and filtering it on a regular basis tends to extend the useful life of the cooking oil and increase the quality and appearance of foods which are cooked therein.

Previous cooking oil filter media include wire mesh strainers, coarse paper, and diatomaceous earth or similar filtering material. Wire mesh strainers are restricted to the removal of large particulate matter. Conventional coarse paper filters (having a pore size of from 4 to 80 microns with a mean pore size on the order of 10 microns) exhibits only moderate filtering effectiveness. Diatomaceous earth and similar filtering materials usually exist in a loose form that is messy and awkward to handle. A further disadvantage common to all previous filters utilizing a covering of diatomaceous earth or other particulate filtering material is the nonuniformity of the thickness and pore opening of the particulate filtering material. Such nonuniformity causes the oil to principally pass through parts of the filter which are the least thickly covered with the particulate filtering material, thereby resulting in improper filtering. This tendency is further accentuated when the cooking oil is forced through the filter under positive pressure or vacuum, rather than by gravitational forces.

As a result, there has been a long-felt need for a cooking oil filter having substantially uniform thickness and a pore size that exhibits excellent filtering properties. Moreover there has been a continuing need for a filter exhibiting these characteristics that is relatively inexpensive and easy to handle. This invention is directed to satisfying this need.

SUMMARY OF THE INVENTION

In accordance with this invention, an improved filter having a porous body, preferably formed in a sheet of substantially uniform thickness less than about 5 millimeters, is disclosed. The porous body of the filter, or more preferably the sheet, has the following composition: 15% to 35% activated carbon; 15% to 40% calcium silicate, magnesium silicate, or mixtures of the two; 25% to 40% cellulosic fiber; up to 2% resin binder; and, optionally, 0% to 30% diatomaceous earth. All percentages are by weight based on the total weight of the foregoing components employed.

In accordance with various other aspects of the present invention, it it most preferred that the substantially uniform thickness of the sheet range from about 4 millimeters to about 4.5 millimeters, that the mean pore size of the porous body (or sheet) range from about 0.5 micron to 25 microns, and a mean pore size ranging from 2 microns to about 6 microns, that the resin binder in the porous body (or sheet) comprises a melamine-formaldehyde resin ranging from about 1% to about 2% by weight of the total weight of the components, and that the cellulosic fiber comprises wood pulp.

As will be readily appreciated, a filter formed in accordance with the present invention by the fabrication process, provides a filtering medium of substantially uniform thickness and porosity exhibiting excellent filtering characteristics. When applied to conventional deep fryer environments, the result is a significant extension of the useful life of the cooking oil.

DETAILED DESCRIPTION OF THE INVENTION

In accordance with the present invention, a filter ideally suited for filtering cooking oil is comprised of activated carbon; calcium silicate, magnesium silicate, or mixtures of the two; cellulosic fiber; and resin binder. The proportions of each component are as follows: 15% to 35%, preferably 25% to 35%, activated carbon; 15% to 40%, preferably 30% to 40%, calcium silicate, magnesium silicate, or mixtures of the two; 25% to 40%, preferably 30% to 40%, cellulosic fiber; and up to 2%, preferably 1% to 2%, resin binder. In a preferred embodiment of the present invention, diatomaceous earth may be included as an additional component. If so, its proportion of the total filter composition may range from 0% to 30%, and preferably from 0% to 15%. The aforementioned percentages are applicable regardless of whether diatomaceous earth is included as a component. All percentages are by weight based on the total weight of the components.

When the above components are processed in a manner similar to that disclosed in the Example below, a filtering material having a porous body is created. In the preferred embodiment of the present invention, the porous body is formed as a sheet having a substantially uniform thickness less than about 5 millimeters. Preferably, the thickness ranges from about 4 millimeters to about 4.5 millimeters. The porous body, and correspondingly the sheet in the preferred embodiment, has a pore size ranging from about 0.5 micron to about 25 microns, and a mean, or average, pore size substantially ranging from about 2 microns to about 6 microns. Pore size (maximum, means, and minimum) is measured in accordance with ASTM method F316-70, as described in Shoemaker, W., "Liquid Filter Media," *Filtration News*, July/August 1985, pp,. 18-21. A "Coulter Poremeter" available from Coulter Electronics, Inc., Hialeah, Fla., is preferably employed to make the measurements. The filter, when formed as a sheet, exists as a thin, rigid, lightweight pad, or wafer. The wafer may have any peripheral shape necessary to fit the requisite filtering application. The basis weight (weight per unit area) for the filter will typically be 800 to 1000 grams per square meter.

Activated carbon is employed to decolorize the cooking oil and absorb odor causing components from the oil. To assist in providing a more homogeneous-like mixture during the filter fabrication process, it is desirable that the activated carbon be in powdered form. A powdered activated carbon sold under the trade name "DARCO S-51" by American Norit Company, Inc. of Jacksonville, Fla. has been found quite satisfactory for such use. Another product that may be used for the activated carbon component is "Cecarbon PAC 200" supplied by Atochem of Pryor, Okla. While the above examples have been cited as sources of activated carbon, it should be understood that other sources possessing similar properties and small amounts of impurities may be employed.

The silicate, whether calcium silicate, magnesium silicate alone, or mixtures of the two is employed to remove free fatty acids that are formed as the oil begins to chemically break down. Preferably, a synthetic calcium silicate, or magnesium silicate, is employed. Again, to assist in providing a more homogeneous-like mixture during the fabrication process (see Example below), it is desirable that the synthetic calcium silicate, or magnesium silicate, be in powdered form. A powdered synthetic calcium silicate sold under the trade name "Silasorb" by the Specialty Products Group of Manville Corp. of Denver, Colo. has proven very successful for such use. Alternatively, a synthetic magnesium silicate sold under the trade name "Magnesol" by Reagent Chemical and Research Inc. of Jeffersonville, Ind. may be employed. While the above products have been cited as potential sources of calcium silicate or magnesium silicate, it should be noted this particular component of the filter composition is not limited to these particular products or to synthetic forms of calcium silicate or magnesium silicate.

The cellulosic fiber provides a support matrix to which the other components can bind. Wood pulp sold under the trade name "Regular Kraft" by Weyerhaeuser Company of Federal Way, Wash. has proven to be an excellent source of cellulosic fiber for such use. Typically, the wood fiber employed has an average fiber length of 2.9 millimeters and an average diameter on the order of 50 microns. Other wood pulp products that may be used for the cellulosic fiber component include "Tyee Kraft" wood pulp, also sold by Weyerhaeuser Company, or any similar soft wood fiber.

Resin binder is present in the filter composition to bind the other components together. Preferably the resin is present at a level of no more than 2% of the filter composition. Most preferably, the amount of resin binder present in the filter composition ranges from about 1% to about 2%. Also preferably, the resin binder is comprised of a melamine-formaldehyde resin. A powdered melamine-formaldehyde resin sold under the trade name "PAREX 607" by American Cyanamid Company of Wayne, N.J. has proven quite successful for such use. While the melamine-formaldehyde resin is most preferred, other nontoxic urea formaldehyde resins may be employed.

If employed, the diatomaceous earth functions to remove particulate matter and to provide increased holding capacity for the particulate matter because of its inherent large surface area. "Grade Kenite 700" diatomaceous earth sold by Witco Chemical Corporation of New York, N.Y. has proven very successful for such use. Other products that may be used for the diatomaceous earth component include "Hyflo Supercel" sold by Manville Corp. of Denver, Colo. and "FW-14" sold by Eagle Picher Industries, Inc. of Cincinnati, Ohio.

The various components and their varying proportions provide for a very versatile system, in that the filter can easily be tailored to specific filtering applications. Such tailoring will be readily appreciated by one of ordinary skill in the art. For example: if the oil contains a high level of particulate matter, the diatomaceous earth proportion can be increased; if the free fatty acid levels are high, the proportion of calcium silicate or magnesium silicate can be increased.

EXAMPLE

The following Example is included to assist one of ordinary skill in making and using the invention. It is intended as a representative example of the present invention and is not intended in any way to limit the scope of this disclosure or the scope of protection granted by Letters Patent hereon. While the filter of the present invention may be produced by many standard methods of fabrication and may consist of varying proportions of the above-described components, the following method of fabrication and mixture of components has resulted in a filter that has proven most efficacious for filtering cooking oil.

A water slurry is created in a simple paddle-type blade mixer by adding the components to water in the following order and proportions: 34% cellulosic fiber; 34% calcium silicate; 30% activated carbon; and 2% resin binder to bond the solid components together. The component percentages are based on the total components added to the water. Sufficient water is employed to adjust the solids content of the slurry to about 2% by weight based on the total slurry. A period of thorough mixing follows. When the mixture appears to be thoroughly mixed, it is then subjected to a shearing action in a refiner.

The final, refined slurry is poured onto a screen to dewater, thereby forming the desired sheet end-product. The uniformity of thickness of the sheet is achieved through the use of moving rakes which uniformly distribute the refined slurry over the surface of the screen. After sufficient dewatering, the moist sheet is dried in an oven. Thereafter, the dried sheet is cut into filter pads, or wafers, of the peripheral size and shape necessary to fit the desired filtering application. The trimmings, or broke, left from cutting the finished sheets may be added as feedstock to make up part of the 2% solids of a subsequent batch of water slurry created in the mixer.

It will be appreciated by persons skilled in the art that the above process can be carried out on an apparatus which makes one sheet at a time or that a continuous sheet can be made on a machine similar to a Fourdrinier (paper making) machine. With such a machine, the uniformity of sheet thickness is controlled by maintaining a uniform discharge of the refined slurry across the width of an underlying moving screen. It will also be appreciated that the porosity of the sheets can be altered by varying the inorganic to cellulose ratio of the components, and by varying the degree of refining.

In summary, a filter formed in accordance with the present invention provides a filter ideally suited for filtering cooking oil traditionally used in deep fryer applications. The combination of components used, uniformity of thickness, and substantial uniformity of pore size results in a filter medium that exhibits excellent filtering properties when applied to such cooking oil applications, thereby extending the useful life of the oil. Filters formed in accordance with the Example above have extended the useful life by as much as 40% over conventional cooking oil filtering media.

The present invention has been described in relation to a preferred embodiment thereof and several alternatives thereto. One of ordinary skill, after reading the foregoing specification, will be able to effect various changes, substitutions of equivalents, and other alterations without departing from the broad concepts disclosed herein. For example, the porosity characteristics, and thereby the filtering characteristics, may be altered as described in the Example above. Additionally, it is anticipated that the filter of the present invention may have practical import in other oil-based filtering environments. It is therefore intended that the scope of Letters Patent granted hereon be limited only by the definition contained in the appended claims and equivalents thereof.

The embodiments of the invention in which an exclusive property or privilege is claimed are defined as follows:

1. A filter having a porous body comprising the following composition

| | |
|---|---|
| activated carbon | 15% to 35% |
| calcium silicate, magnesium silicate, or mixtures thereof | 15% to 40% |
| cellulosic fiber | 25% to 40% |
| resin binder | up to 2% |
| diatomaceous earth | 0% to 30% | all percentages herein by weight based on the total weight of the foregoing components.

2. The filter of claim 1, wherein said porous body comprises a sheet having a substantially uniform thickness less than about 5 millimeters.

3. The filter of claim 2, wherein said thickness ranges from about 4 millimeters to about 4.5 millimeters.

4. The filter of claim 1, wherein said porous body has pores substantially ranging in size from about 0.5 micron to about 25 microns.

5. The filter of claim 1, wherein the mean pore size in said porous body ranges from about 2 microns to about 6 microns.

6. The filter of claim 1, wherein said calcium silicate component is synthetic calcium silicate.

7. The filter of claim 1, wherein said cellulosic fiber comprises wood pulp.

8. The filter of claim 1, wherein said resin binder ranges from about 1% to about 2% by weight of the total composition of said porous body.

9. The filter of claim 1, wherein said resin binder comprises a melamine-formaldehyde resin.

10. The filter of claim 1 further comprising:

| | |
|---|---|
| activated carbon | 25% to 35% |
| calcium silicate, magnesium silicate, or mixtures thereof | 30% to 40% |
| cellulosic fiber | 30% to 40% |
| resin binder | 1% to 2% |
| diatomaceous earth | 0% to 15% | all percentages herein by weight based on the total weight of the foregoing components.

* * * * *

UNITED STATES PATENT AND TRADEMARK OFFICE
CERTIFICATE OF CORRECTION

PATENT NO.   :  4,988,440
DATED        :  January 29, 1991
INVENTOR(S)  :  R.D. Bernard, et al It is certified that error appears in the above-identified patent and that said Letters Patent is hereby corrected as shown below:

| COLUMN | LINE | |
|---|---|---|
| 2 | 16 | after "process" insert --described in the Example below, or by any other comparable fabrication process-- |
| 3 | 53 | "PAREX 607" should be --PAREZ 607-- |
| 1 | 6 | "303,584" should be --303,854-- |

Signed and Sealed this

Twenty-ninth Day of June, 1993

Attest:

MICHAEL K. KIRK

Attesting Officer       Acting Commissioner of Patents and Trademarks